J. Wheelock,
Rotary Steam Valve.
Nº 32,593. Patented June 18, 1861.
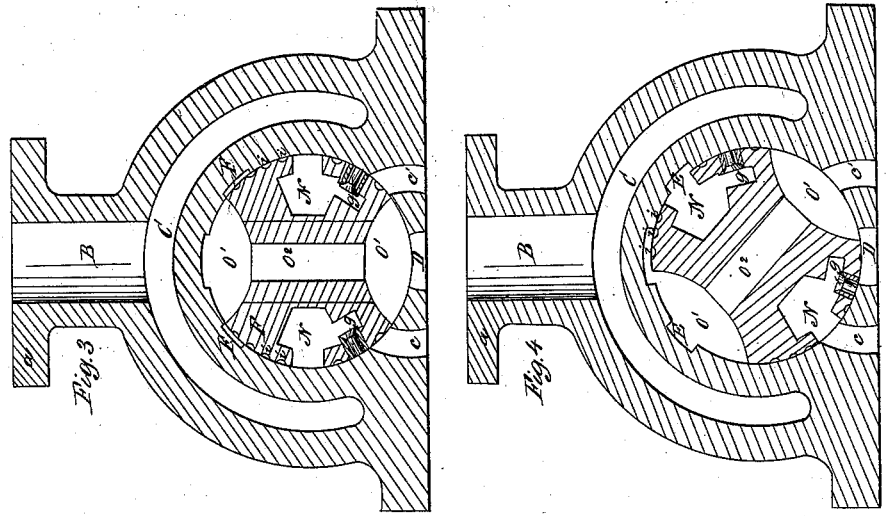
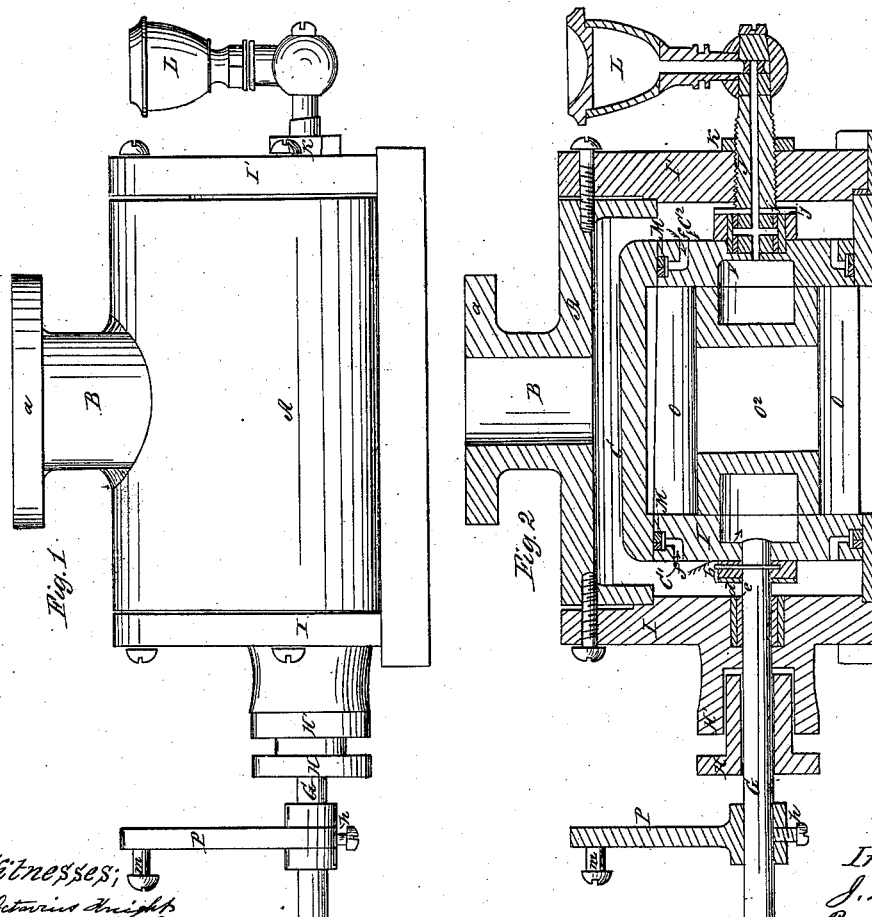
Witnesses:
Inventor:

UNITED STATES PATENT OFFICE.

JEROME WHEELOCK, OF WORCESTER, MASSACHUSETTS.

ROTARY VALVE FOR STEAM-ENGINES.

Specification of Letters Patent No. 32,593, dated June 18, 1861.

*To all whom it may concern:*

Be it known that I, JEROME WHEELOCK, of Worcester, in the county of Worcester and State of Massachusetts, have invented certain new and useful Improvements in Rotary Valves; and I do hereby declare that the following is a full, clear, and exact description of the same, reference being had to the accompanying drawings, making part of this specification, in which—

Figure 1, represents an elevation of the valve at half stroke. Fig. 2, is a vertical axial section of the same. Fig. 3, is a central transverse section thereof in the same position. Fig. 4, is a central transverse section at the commencement of the stroke.

Similar letters of reference indicate corresponding parts in the several figures.

My invention consists:—1st. In the combination and arrangement of packing rings, in the periphery of and near the ends of a conical plug valve in connection with steam spaces, in the manner and for the purpose hereinafter more fully explained. 2nd. The combination of plug valve hollow centering screw and steel bushings, arranged and operating in the manner and for the purposes hereinafter explained.

To enable others skilled in the art to make and use my invention I will proceed to describe its construction and operation.

A represents a cylindrical casing, provided on its upper side with a branch pipe B, and flange (a) to which the steam pipe is attached in the usual manner.

C, is an annular channel, formed between the interior and exterior shell of the casing and concentric therewith. This channel extends the entire length of the inner shell and communicates with the interior thereof at each end through chambers C', and C², and with the steam pipe through the branch pipe B.

c c', represent steam or induction ports, and D, an exhaust or eduction port formed in the bottom of the casing, and corresponding with those of the steam chest to which the valve casing is attached.

E, E, represent shallow cavities formed in the inner shell immediately opposite of the steam and exhaust ports before mentioned, for the purpose hereinafter more fully explained.

F, is a valve of conical form fitting within the inner shell which is of corresponding form.

G, is a valve stem, fitted into the larger end of the valve. The stem G, works through a stuffing box H, H', of the head I, in the usual manner. The inner side of the head I, is recessed and a steel bush $d$, pressed therein into which a steel ring or sleeve $e$, secured upon the valve stem is fitted and works for the purpose of receiving the wear which would otherwise come upon the stem and head. These rings can be replaced by others when worn.

J, is a centering or pivot screw fitted into the rear head I, of the valve casing and provided on its inner end with a steel ring or sleeve $j$, which fits into a corresponding bush $j'$, in the end of the valve and in a measure supports that end and prevents the valve from being crowded by reason of its taper form, thereby avoiding the great friction and consequent wear of the valve which would otherwise attend its use.

K, is a check nut fitted upon the screw J, and when brought against the head of the cylinder prevents the screw from being casually moved.

L, is an oil receiver or cup attached to the outer end of the screw J. The said screw has an aperture passing longitudinally through it into the ports of the valve through which oil from the receiver passes to the inside of the valve, when by the action of steam it is blown over the whole surface thereby lubricating all of its parts.

M, M, are annular split rings fitted in corresponding grooves formed in each end of the valve.

$f$, $f$, are apertures through which steam passes to the under side of the said rings causing them to expand and by their expansion to make a steam tight joint between the surface of the valve and its chamber.

N, N, are steam ports formed on opposite sides of the valve and communicating with the annular steam space through openings at each end of the valve.

$O^2$, is a slot or exhaust opening passing through the center of the valve at right angles to the steam ports and completely isolated therefrom.

$i$, $i$, $i$, are a series of grooves or channels formed in the periphery and running longitudinally of the valve, for the purpose of forming a water packing to prevent the escape of steam, from the steam to the exhaust ports.

$g$, $g$, are anticompression valves arranged in the "lap" of the valve so as to open inwardly and relieve the steam cylinders of any undue pressure.

P, is an arm fitted upon the valve stem and secured by a set screw $h$.

$m$, is a wrist-pin secured in the outer end of the arm P.

The valve being of tapering form to fit the bore of the casing it is adjusted by the center screw so that the two surfaces shall not come in contact but throw the weight of the valve upon the steel rings and bushings at each end. The end of the valve opposite to the center screw being the largest in diameter, a greater surface is exposed to the action of the steam the result of which is that the valve is kept constantly pressed toward the center screw and in place. When the valve is properly adjusted by the screw J, it is kept from casually turning by the set nut K.

The casing is fastened to the face of the common cylinder with the valve stem at right angles with the piston rod. Steam being admitted through the branch pipe B into the annular space, passes into the valve through the openings at each end, from thence it is admitted into the respective ends of the engine cylinder alternately through the steam ports (see Fig. 4). The steam ports of the valve passing entirely through it admit steam to opposite sides thereof at the same time which equalizes the pressure upon the valve and keeps it perfectly balanced. The steam having completed its work through the port $c$, the valve is rotated so that the exhaust cavities O, O', cover the steam port $c$, exhaust D, and shallow spaces E, E, allowing the steam to escape from the cylinder into the air or condenser, the pressure of the exhaust being equalized on the valve by the rush of steam through the passage $O^2$, filling the shallow ports on the opposite side. The valve being further rotated steam passes through the port $c$ into and through the valve with the same results as before. The friction of the valve packing rings against the surface of the shell resulting from their expansion causes them to remain stationary while the valve is being rotated so that little or no wear occurs to the rings. It is sometimes necessary to relieve the engine cylinder of back pressure. This is effected by means of the anticompression valves which are so placed in the lap of the valve that when the back pressure in the engine cylinder is greater than that in the boiler the valves will open inward and thus relieve the engine cylinder.

Having thus described my invention, what I claim as new and of my invention herein, and desire to secure by Letters Patent, is:—

1. The packing rings M, when used in connection with the end chambers C', $C^2$, and apertures $f$, $f'$, in the manner and for the purposes explained.

2. The combination of the centering screw J, and steel bushings $d$, $e$, $j$, with the conical plug valve F, substantially as and for the purposes set forth.

JEROME WHEELOCK.

Witnesses:
S. D. HICKOK,
P. LAVERTY.